(12) United States Patent
Moriarty et al.

(10) Patent No.: US 12,488,688 B2
(45) Date of Patent: Dec. 2, 2025

(54) METHOD AND CONTROL UNIT FOR OPERATING A MOTORCYCLE

(71) Applicant: Robert Bosch GmbH, Stuttgart (DE)

(72) Inventors: Daniel Moriarty, Glenroy (AU); Jiawei Liao, Clayton (AU); Matthew Peters, Ypsilanti, MI (US); Simeon Bain, Montmorency (AU)

(73) Assignee: ROBERT BOSCH GMBH, Stuttgart (DE)

( * ) Notice: Subject to any disclaimer, the term of this patent is extended or adjusted under 35 U.S.C. 154(b) by 90 days.

(21) Appl. No.: 18/417,645

(22) Filed: Jan. 19, 2024

(65) Prior Publication Data

US 2024/0249625 A1 Jul. 25, 2024

(30) Foreign Application Priority Data

Jan. 24, 2023 (DE) .................... 10 2023 200 499.2

(51) Int. Cl.
  *G08G 1/16* (2006.01)
  *B62J 45/20* (2020.01)
  *B62J 45/41* (2020.01)
  *B62J 50/22* (2020.01)

(52) U.S. Cl.
  CPC .............. *G08G 1/166* (2013.01); *B62J 45/20* (2020.02); *B62J 45/41* (2020.02); *B62J 50/22* (2020.02)

(58) Field of Classification Search
  CPC ... B62J 45/20; B62J 45/41; B62J 50/22; B62J 50/21; B62J 6/00; B62J 27/00; B60W 2554/804; B60W 2554/802; B60W 30/0953; B60W 30/0956; B60W 50/14; B60W 2050/143; B60W 2050/146; B60W 2300/36; B60Y 2200/12; G08G 1/167
  See application file for complete search history.

(56) References Cited

U.S. PATENT DOCUMENTS

| | | | |
|---|---|---|---|
| 2013/0311075 A1* | 11/2013 | Tran ........................ | B60Q 1/535 701/117 |
| 2021/0188270 A1* | 6/2021 | Horn ........................ | B62J 45/20 |
| 2021/0197816 A1* | 7/2021 | Horn ........................ | B62J 50/22 |
| 2024/0034428 A1* | 2/2024 | Pfau ................... | G08G 1/096791 |
| 2024/0199161 A1* | 6/2024 | Pfau ....................... | B60W 50/14 |

FOREIGN PATENT DOCUMENTS

| | | |
|---|---|---|
| DE | 102006037015 A1 | 2/2008 |
| DE | 102013222598 A1 | 5/2015 |
| DE | 102016116839 A1 | 3/2017 |
| DE | 202017107397 U1 | 12/2017 |
| DE | 102017212432 A1 | 1/2019 |
| DE | 102017219892 A1 | 5/2019 |
| DE | 112014007205 B4 | 12/2020 |
| DE | 102020113507 A1 | 6/2021 |
| DE | 102021203763 A1 | 10/2022 |
| WO | 2022229805 A1 | 11/2022 |

\* cited by examiner

*Primary Examiner* — Sisay Yacob
(74) *Attorney, Agent, or Firm* — NORTON ROSE FULBRIGHT US LLP

(57) ABSTRACT

A method for operating a motorcycle. In the method, distance information is provided if a time gap between the motorcycle and a vehicle in a rear area of the motorcycle is smaller than a predefined time value.

14 Claims, 3 Drawing Sheets

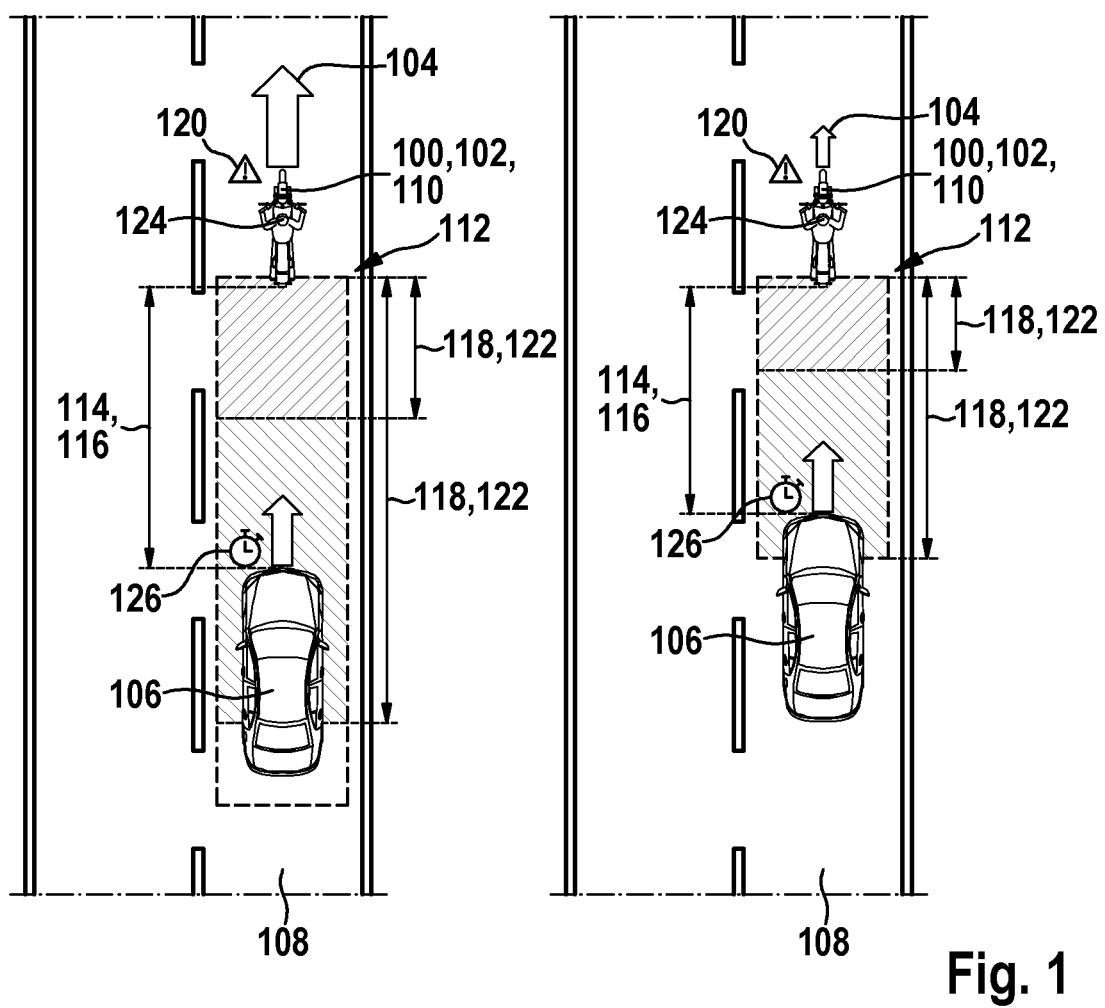
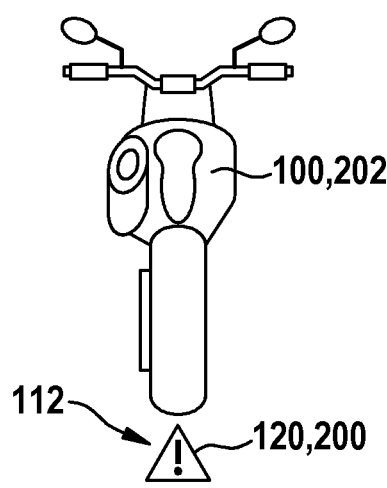
Fig. 1
Fig. 2

METHOD AND CONTROL UNIT FOR OPERATING A MOTORCYCLE

FIELD

The present invention relates to a method for operating a motorcycle, to a corresponding control unit and to a corresponding computer program product.

BACKGROUND INFORMATION

When driving, the driver of a motorcycle substantially concentrates on the course of the road in front of the motorcycle and in doing so tends not to look in the rear view mirror very much. As a result, he may not notice, for example, a vehicle driving close up behind the motorcycle. A dangerous situation can arise if the driver then brakes hard.

SUMMARY

Against this background, the present invention provides a method for operating a motorcycle, a corresponding control unit, and a corresponding computer program product. Advantageous developments and improvements of the present invention emerge from the disclosure herein.

According to the present invention, a region referred to as a rear area behind a motorcycle is detected by a sensor system of the motorcycle and information provided by the sensor system about the rear area is evaluated. In doing so, vehicles are detected in the rear area and at least a current distance of the relevant vehicle from the rear end of the motorcycle is determined. In addition, a current speed of the motorcycle is used to evaluate the distance.

The distance can be smaller at low speeds than at high speeds. The distance can thus be expressed as a time gap. The time gap is a time period that elapses before a vehicle traveling behind reaches a point that the motorcycle previously traversed. Thus, the time gap remains the same when the vehicle traveling behind increases the distance proportionally to an increase in speed.

According to an example embodiment of the present invention, the time gap is determined from the measured distance and the current speed of the motorcycle and compared with a predetermined value for the time gap. If the distance of a vehicle and the speed of the motorcycle result in a time gap that is smaller than the value, distance information is output. The distance information is primarily for information purposes, since an acutely dangerous situation does not yet exist. However, a dangerous situation can quickly arise if the motorcycle and/or the vehicle traveling behind act incorrectly.

The present invention disclosed herein can warn of danger to the motorcycle that is not yet acute. The danger which is not yet acute can be referred to as a latent danger. The motorcycle driver can be informed by the distance information that the vehicle is driving up close behind. The driver can thus avoid driving maneuvers which would lead to an acute danger.

According to an example embodiment of the present invention, a method for operating a motorcycle is provided, wherein a distance between the motorcycle and a vehicle traveling behind in a rear area of the motorcycle is determined by means of a sensor system of the motorcycle directed toward the rear, and distance information is provided on a human-machine interface if a time gap, which is determined taking into account the determined distance and a current speed of the motorcycle, is smaller than a predefined time value.

Ideas for embodiments of the present invention may be considered, inter alia, as being based on the concepts and findings described below.

According to an example embodiment of the present invention, a vehicle in a rear area behind a motorcycle may be controlled by another road user. The vehicle may be another motorcycle, a motor vehicle or a truck.

The vehicle can be detected by a sensor system of the motorcycle directed to the rear. The sensor system can in particular comprise a radar sensor. The sensor system can map at least one distance between the motorcycle and the vehicle in sensor information. The sensor system can also map a direction from the motorcycle to the vehicle in direction information.

A time gap can represent a speed-dependent distance between the motorcycle and the vehicle. A constant time gap can represent different distances for different speeds. The distance thereby becomes greater as the speed increases. The time gap can thus represent a ratio between an absolute distance and a speed of the motorcycle. The speed-dependent distance or the time gap can represent a latent danger to the motorcycle presented by the vehicle.

According to an example embodiment of the present invention, a time value can be a threshold value for the speed-dependent distance. If the time gap is smaller than the time value, there may be a latent danger to the motorcycle.

Distance information can in particular inform a driver of the motorcycle about the latent danger. For example, the distance information can be provided to the driver via a human-machine interface of the motorcycle. Likewise, the distance information can be transmitted via a communication interface of the motorcycle to the vehicle and can be provided in the vehicle on a vehicle display to a vehicle driver. Likewise, the distance information can be provided to other road users via an optical signaling device of the motorcycle. The distance information can be provided visually, acoustically and/or haptically to a driver of the motorcycle and/or a driver of the vehicle. For example, a vehicle symbol and/or warning symbol can be displayed behind or below a symbol of the motorcycle to the driver of the motorcycle.

The distance information can be provided if the time gap is less than the time value for longer than a predefined period. The distance information can be provided with a delay equal to the period. If the time gap within the time period again becomes greater than the time value, the provision can be dispensed with. It can thus be prevented that the distance information is provided even though the time gap to the vehicle only briefly falls below the time value.

According to an example embodiment of the present invention, the distance information can be provided if a speed at which the vehicle is approaching the motorcycle is less than a limit value. The distance information is intended to signal a latent danger. The danger is only latent if the vehicle approaches slowly. If the vehicle approaches too quickly, i.e., if the approach speed is greater than the limit value, hazard information that maps a hazard to the motorcycle presented by the vehicle can be provided. Hazard information can signal a need to act in order, for example, to prevent the vehicle from colliding with the motorcycle. If the approach speed is greater than the limit value, a time to collision can be calculated. The hazard information can represent an escalation of the distance information.

According to an example embodiment of the present invention, the time value can be adjusted using the speed of the motorcycle. The time gap from which the distance information is provided can become smaller as the speed of the motorcycle increases. The relationship between the speed and the time value can be non-linear. The relationship can be shown in a curve or table. The time value can be smaller at a higher speed.

An intensity of the distance information can be adjusted using the time gap. If the time gap is smaller, the intensity can increase. The increase can take place continuously. For example, the smaller the time gap, the more the size of the symbol displayed can increase. If the time gap is smaller than a hazard threshold, the hazard information can be provided.

According to an example embodiment of the present invention, advance warning distance information can be provided if the time gap is smaller than an advance warning time value. Warning distance information can be provided if the time gap is smaller than a warning time value. The warning distance information can have a higher intensity than the advance warning distance information. The warning time value can be smaller than the advance warning time value. A stepwise warning cascade can be provided by different warning levels. The warning cascade can also migrate into the hazard information to warn of acute danger and to prompt to take action.

The distance information can be provided if the vehicle is detected in the motorcycle's lane. A vehicle in an adjacent lane does not represent a latent danger to the motorcycle, as long as the motorcycle remains in its lane.

The motorcycle's blind spot assist can be activated if the vehicle is detected in the adjacent lane. A blind spot assist enables side-related information to be provided. The distance information for a vehicle in the motorcycle driver's own lane can be provided without a reference to a side. The blind spot assist can show the driver the side on which the other vehicle has been recognized. The driver can then, for example, refrain from changing lanes in order to avoid approaching the other vehicle dangerously.

The course of the lane can be determined using the trajectory traveled by the motorcycle. A traveled trajectory can map bends in the lane. The distance information can thus also be reliably provided in the bends or on a bendy stretch.

According to an example embodiment of the present invention, the time value can be adjusted using an input by the motorcycle driver. The time value can be preselected by the driver. As a result, the driver can adjust the point from when he wants to be warned about the latent danger. The time value can, for example, be adjusted continuously, i.e., without predefined stages or predefined values. For example, the time value can be adjusted via an operator interface of the motorcycle, such as a slide control or rotary control.

At least two predefined time values can be provided to select from for the input. The time values can be selected, for example, via an operator interface, such as pre-allocated buttons or a rocker switch. In particular, a low, a medium and a high time value can be provided for selection. As a result, the driver can configure in stages the point from when he wants to be warned about the latent danger.

The method is preferably computer-implemented and can be implemented, for example, in software or hardware or in a mixed form of software and hardware, for example in a driver assistance system.

An example embodiment of the present invention furthermore provides a control unit in the form of a driver assistance system for a vehicle, wherein the driver assistance system is designed to carry out, control or implement, in corresponding apparatuses, the steps of a variant of the method of the present invention presented here.

The control unit or driver assistance system can be an electrical device having at least one computing unit for processing signals or data, at least one memory unit for storing signals or data, and at least one interface and/or one communication interface for reading in or outputting data embedded in a communication protocol. The computing unit can, for example, be a signal processor, a so-called ASIC system, or a microcontroller for processing sensor signals and outputting data signals on the basis of the sensor signals. The memory unit can, for example, be a flash memory, an EPROM, or a magnetic memory unit. The interface can be designed as a sensor interface for reading in the sensor signals from a sensor and/or as an actuator interface for outputting the data signals and/or control signals to an actuator. The communication interface can be designed to read in or output the data in a wireless and/or wired manner. The interfaces may also be software modules that are present, for example, on a microcontroller in addition to other software modules.

A computer program product or a computer program having program code that can be stored on a machine-readable carrier or storage medium, such as a semiconductor memory, a hard disk memory, or an optical memory, and that is used for carrying out, implementing, and/or controlling the steps of the method according to any one of the embodiments of the present invention described above is advantageous as well, in particular when the program product or program is executed on a computer or a device.

It is pointed out that some of the possible features and advantages of the present invention are described herein with reference to different embodiments. A person skilled in the art recognizes that the features of the control unit and of the method of the present invention can be suitably combined, adapted, or replaced in order to arrive at further embodiments of the present invention.

BRIEF DESCRIPTION OF THE DRAWINGS

Embodiments of the present invention are described below with reference to the figures, and neither the figures nor the description should be construed as limiting the present invention.

FIG. 1 shows representations of traffic situations of a motorcycle having a control unit according to one exemplary embodiment of the present invention.

FIG. 2 shows a representation of distance information by a control unit according to one exemplary embodiment of the present invention.

Figure 3:
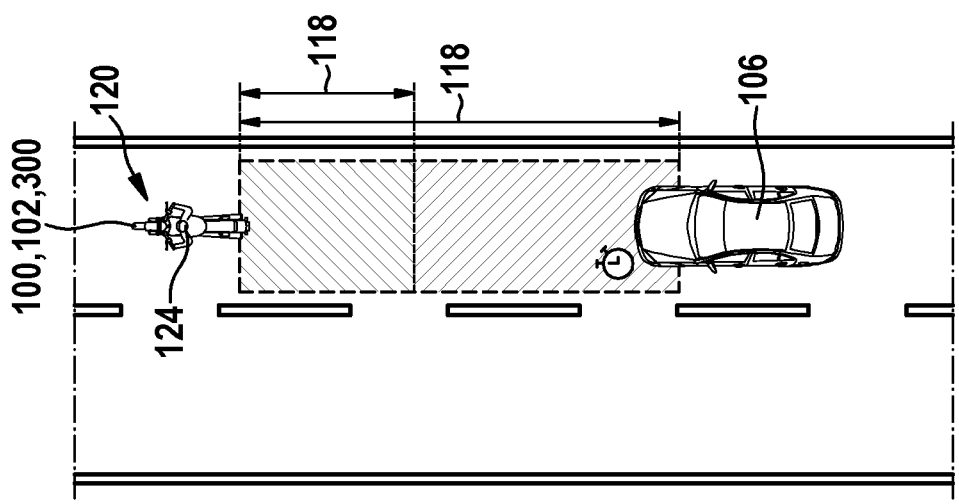
FIG. 3 shows representations of adjustable time values on a motorcycle having a control unit according to one exemplary embodiment of the present invention.
Figure 3:
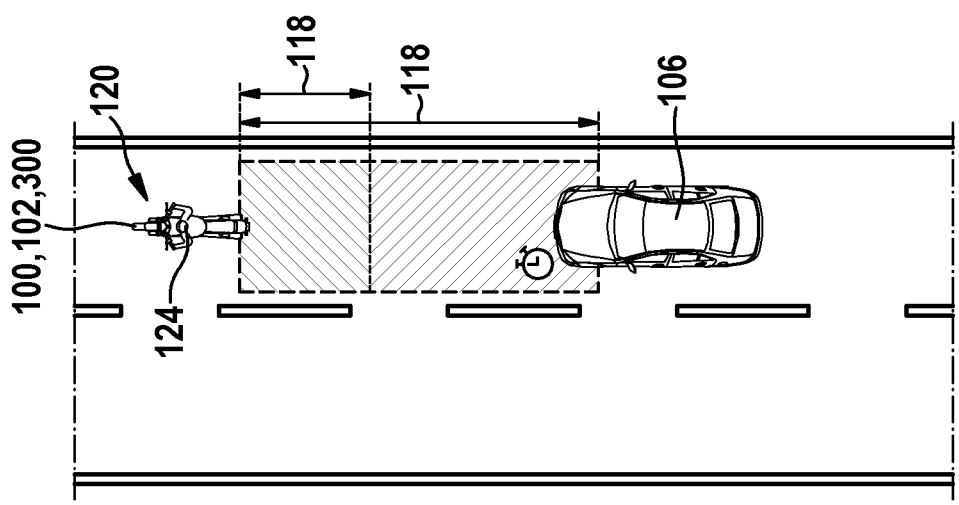
Figure 3:
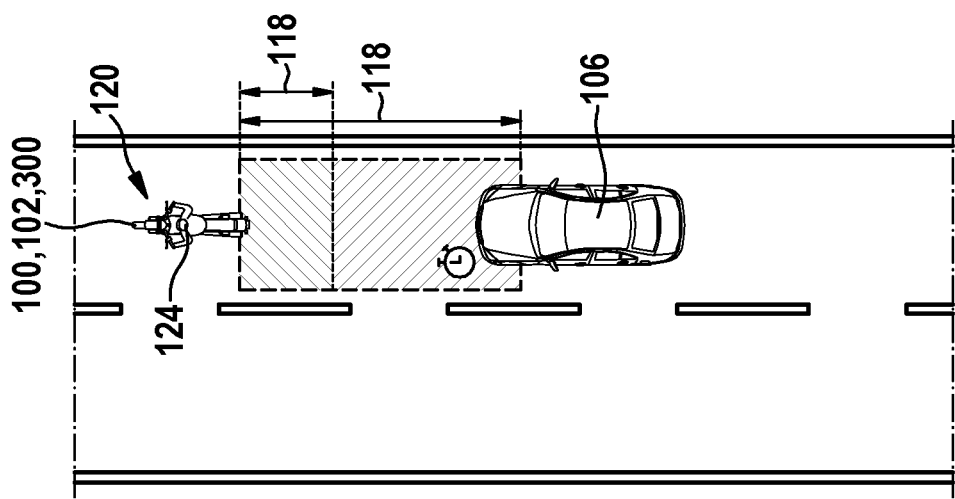

The figures are merely schematic and not true to scale. Identical reference signs refer to identical or identically acting features.

DETAILED DESCRIPTION OF EXAMPLE EMBODIMENTS

FIG. 1 shows representations of traffic situations of a motorcycle 100 having a control unit 102 according to one exemplary embodiment. In the two traffic situations shown, the motorcycle 100 travels at different speeds 104. In both traffic situations, a vehicle 106 is driving in the motorcycle's 100 lane 108 behind the motorcycle 100. The motorcycle 100 comprises a sensor system 110 which detects the vehicle 106 in a rear area 112 behind the motorcycle 100. The sensor system 110 detects at least a current distance 114 of the vehicle 106 from the motorcycle 100. The distances 114 are different in the two traffic situations.

In one exemplary embodiment, a current time gap 116 between the motorcycle 100 and the vehicle 106 is calculated in the control unit 102 using the distance 114 and the speed 104 of the motorcycle 100. The time gap 116 represents a period that elapses before the vehicle 106 reaches the same point that the motorcycle 100 previously traversed. If the time gap 116 is smaller than a predefined time value 118, distance information 120 is provided. The time value 118 represents a speed-dependent distance 122 which the vehicle 106 should not undershoot. The greater the speed 104, the greater also the speed-dependent distance 122.

In one exemplary embodiment, the speed-dependent distance 122 is calculated in the control unit 102 using the time value 118 and the speed 104. If the distance 114 of the vehicle 106 is smaller than the speed-dependent distance 122, the distance information 120 is provided.

Here, in both traffic situations, the current time gap 116 is smaller than the time value 118 or the vehicle 106 undershot the speed-dependent distance 122 in both traffic situations. The distance information 120 is thus provided in both traffic situations. The distance information 120 informs a driver 124 of the motorcycle 100 here that the vehicle 106 is coming up close behind the motorcycle 100. The distance information 120 results in the driver 124 being warned of a latent danger presented by the vehicle 106. The distance information 120 signals to the driver 124, for example, that he should watch the vehicle 106 in the rear view mirror, or that he should refrain from braking hard without reason so as not to create a situation in which vehicle 106 poses a real danger.

In one exemplary embodiment, the distance information 120 is provided after the vehicle 106 is traveling behind the motorcycle 100 closer than the speed-dependent distance 122 for longer than a predefined period 126 or with a smaller time gap 116 than the time value 118.

In one exemplary embodiment, advance warning distance information 120 is provided if the time gap 116 is smaller than an advance warning time value 118 or the vehicle 106 drives up behind more closely than a speed-dependent advance warning distance 122. If the vehicle 106 drives up even more closely behind the motorcycle 100, i.e., if the current distance 114 is smaller than a speed-dependent warning distance 122, or if the time gap 116 is smaller than a warning time value 118, warning distance information 120 is provided. The warning time value 118 or the warning distance 122 is smaller than the advance warning time value 118 or the advance warning distance 122. The warning distance information 120 has a higher intensity than the advance warning distance information 120. By using different time values 118 or speed-dependent distances 122, the provision of the distance information 120 works in stages. The driver 124 is thus warned increasingly strongly of an increasing latent danger.

In one exemplary embodiment, the sensor system 110 detects whether the vehicle 106 is traveling in the same lane 108 as the motorcycle 100. The lane 108 can be detected, for example, using the trajectory traveled. The lane can thus also be correctly recognized in bends. The distance information 120 is provided if the vehicle 106 travels in the same lane 108 and drives up more closely than the speed-dependent distance 122 or drives behind the motorcycle 100 with a smaller time gap 116 than the time value 118. If the vehicle 106 is driving in an adjacent lane, the motorcycle's 100 blind-spot assist is activated, for example.

FIG. 2 shows a representation of distance information 120 by means of a control unit according to one exemplary embodiment. The distance information 120 substantially corresponds to the distance information in FIG. 1. Here, the distance information 120 is shown as a warning symbol 200 under or behind a motorcycle symbol 202 for the motorcycle 100 in order to indicate that there is the threat of latent danger in the rear area 112.

The distance information 120 is provided here to the driver of the motorcycle via an optical display. The display can, for example, be integrated into an instrument cluster of the motorcycle. The display can also be integrated into a helmet display or head-up display of the motorcycle. Likewise, the display can take place on a mobile device coupled to the motorcycle, such as a navigation system or a mobile phone.

In order to display different intensities of the latent danger, the warning symbol 200 can be shown in modifiable colors and/or modifiable sizes in order to attract the driver's attention to a greater or lesser degree. Here, the warning symbol 200 is shown in yellow and small in relation to the motorcycle symbol 202.

FIG. 3 shows representations of adjustable time values 118 on a motorcycle 100 having a control unit 102 according to one exemplary embodiment. The motorcycle 100 substantially corresponds to the motorcycle in FIG. 1. In addition, the motorcycle 100 comprises an operator interface 300 via which the at least one time value 118 that has just been used can be influenced. The time value can be increased or reduced depending on the personal preferences of the driver 124. Depending on preference, the distance information 120 can thus be provided when the vehicle 106 is at a greater or smaller distance from the motorcycle 100.

In one exemplary embodiment, the time value 118 can be adjusted continuously. The adjustment can take place, for example, via a slide control or rotary knob. In the case of continuous adjustment, the driver 124 can precisely adjust his desired time value 118.

In one exemplary embodiment, the time value 118 can be selected from predefined, stored values. For example, it is possible to switch between these values or to directly select one of the predefined values. The driver 124 can thus select the best matching time value 118.

In one exemplary embodiment, both the advance warning time value 118 and the warning time value 118 are influenced by the selection via the operator interface 300. The different time values can thereby be influenced via a common factor that can be adjusted at the operator interface 300.

Figure 4:
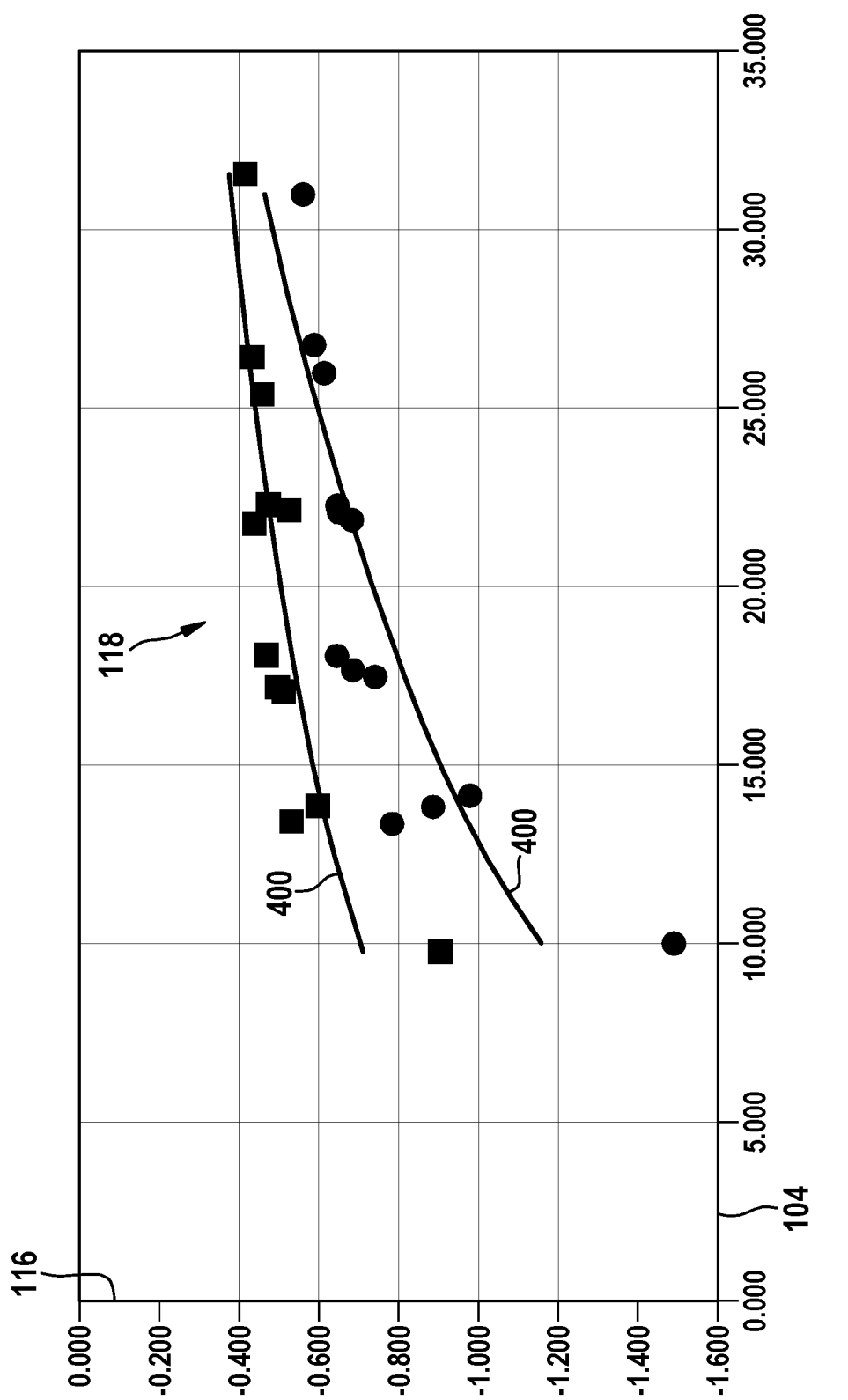
FIG. 4 shows a representation of a speed dependence of time values for a control unit according to one exemplary embodiment of the present invention.

FIG. 4 shows a representation of a speed dependence of time values 118 for a control unit according to one exemplary embodiment. The time values 118 are shown in a diagram that has a speed 104 of the motorcycle plotted on its abscissa and time gaps 116 on its ordinate. The time values 118 corresponding to the time gaps 116 in which the distance information is to be provided are plotted for different speeds 104 between approximately 10 meters per second and approximately 32 m/s in the diagram. The time values 118 are between approximately 1.5 seconds at approximately 10 m/s and 0.4 seconds at approximately 32 m/s. The remaining time values 118 are therebetween. There is no linear relationship between the time values 118 and the speed 104. In general, however, a distribution of the time values 118 shows a decrease in the time values 118 as the speed 104 increases.

In one exemplary embodiment, two groups of time values 118 are plotted in the diagram. The one group represents higher advance warning time values 118 for advance warning distance information, while the other group represents lower warning time values 118 for warning distance information. The advance warning time values 118 are distributed between approximately 1.5 seconds at 10 m/s and approximately 0.5 seconds at approximately 31 m/s. The warning time values 118 are distributed between 0.9 seconds at 10 m/s and 0.4 seconds at approximately 32 m/s.

In one exemplary embodiment, characteristic curves 400 for the advance warning time values 118 and warning time values 118 are plotted in the diagram. Using the characteristic curves 400, in each case a corresponding advance warning time value 118 and warning time value 118 can be read out from the diagram in relation to the current speed 104.

Possible embodiments of the present invention are summarized again below or described using slightly different words.

Rearward distance information for two-wheeled vehicles is presented. The main objective is to supply a motorcycle driver with warning information if there is a latent danger presented by objects in the rear that are detected by a rear-end radar system.

Latent danger is the concept of danger to the respective motorcycle (and/or the following vehicle) in situations which are not yet acute but which can escalate very quickly, such as a vehicle which is following the respective vehicle at the same speed, but at a dangerous distance.

A warning system for a driver may output a warning as a function of the time to collision with a critical following or approaching vehicle. The time to collision is in that case based on factors such as the acceleration of the vehicle and/or the deceleration of the vehicle. In contrast, in the approach presented here, warning information is output in scenarios with a latent danger. In this case, a criticality is described on the basis of the absolute speed of the motorcycle.

A rear-end detection unit (rear-end radar) on the respective motorcycle detects relevant vehicles which can present a latent danger. Such vehicles can be referred to as target vehicles. A decision unit (in particular also in the rear-end radar) decides whether the vehicle presents a high latent danger and whether a warning message should be output. An HMI unit (head unit display, driver helmet, and/or rear-end warning lights) transmits, visually or acoustically, a logo, a distance indication, a risk level or a vehicle type to the driver or the vehicle traveling behind.

The rear detection unit is the rear-end radar, which detects the vehicle. The latent distance warning deals with situations in which one vehicle follows another with too little distance in between. The decision unit is located in the computer/ECU of the rear sensor. The decision unit decides whether the vehicle meets the conditions for latent danger, and then decides about a warning level to be output.

The driver is warned in situations that are not yet acute but can escalate very quickly if the driver brakes suddenly. The latent warning is activated if it is detected that the driver is in a latent danger situation and a safety time gap has been undershot over a defined time.

In one exemplary embodiment, the driver has the option of selecting different threshold values and/or threshold values for the safety time gap.

Safety time gap means that if the respective vehicle (motorcycle) increases its speed, the threshold value for a safety distance for triggering information is also increased proportionally.

The warning is output if the time interval between the respective vehicle and the following vehicle falls below a certain limit value for a certain time. The time interval is calculated as:

$$\text{Time interval} = \text{relative distance from the vehicle} / \text{absolute speed of the motorcycle}$$

In this context, the permissible relative distance between the rear end of the motorcycle and the front of the vehicle, before it triggers the warning message, depends on the speed of the motorcycle:

$$\text{Triggering threshold} = \text{absolute speed of motorcycle} * \text{time value}$$

If the decision unit (radar) decides that the situation has become more critical, it can trigger a warning cascade (by transmitting stronger warning information to the driver or the driver traveling behind), or it can activate other motorcycle assistance systems and in doing so suppress or adapt itself.

For example, warning level 1 is selected as a warning threshold if the period is less than 0.8 s, and warning level 2 is selected if the period is less than 0.4 s.

An activation delay means that the warning is not output if the time interval is below the limit value only for a very short time.

This warning is for information purposes in the HMI device. If the situation remains unchanged, no accident will occur. The driver should, however, be informed about the surrounding traffic conditions so that he has the opportunity to adapt his driving behavior. With the HMI warning, the driver is able to react in such a way that an accident can be prevented if the vehicle traveling behind unexpectedly accelerates strongly or, vice versa, if the motorcycle brakes quickly. The information displayed to the driver is proportional to the criticality of the situation. The driver is at least warned in case of latent danger visually by a logo on the head unit.

In one example, the rear latent distance information depends on an adaptive period.

The RLADI function described above only uses a fixed time interval threshold in each case for the level 1 or level 2 warning to the driver. If the following vehicle falls below this fixed time interval, a warning is output. However, a fixed time interval may not be appropriate in the case of different speeds of the ego vehicle. The reasons for this are, inter alia, the greater severity of the accident at higher speeds, the theoretical limits of the braking and deceleration capacity of the vehicle, and the theoretical limits of the human reaction time of the vehicle. The period that offers the greatest safety and the greatest comfort to the driver at low speeds is therefore possibly not optimal for situations at high speeds. In addition, different end users can have different preferences for this adaptive time-span behavior.

Here, the function is adapted to the time intervals which are based on the ego speed and the setting of the time interval curve by the driver/manufacturer.

An option for adjusting the parameters for the time-gap curve and an online function adaptation for changing the time gap threshold (for a plurality of warning levels) depending on the ego speed are therefore required.

A curve is selected offline as a basis for the adaptive adjustment. This can be the curve function or base points scanned along the curve. The curve can be linear, logarithmic, etc. The adjustment can be defined and permanently encoded by the sensor or vehicle manufacturer, and/or it can be selected by the driver via an HMI interface/menu settings.

During operation, the sensor implementing the RLADI function detects the ego vehicle speed. Using the ego vehicle speed as an input (X value), the output time interval value (Y value) is determined and interpolated from the time-interval curve settings stored in the memory. The function for the rear latent distance information is then carried out as usual, wherein, however, the calculated threshold value and not the fixed value is used for the time interval.

The latent distance information is activated only for vehicles that get very close to the ego speed (i.e., no time to collision can be calculated), and does not switch continuously at a fixed time interval to the ego when the ego speed changes (i.e., the warning timing adapts to the ego speed).

In one example, the rear latent distance information is output for two-wheeled vehicles depending on a configurable time-gap setting.

The function described above defines the threshold value for the warning time period as an adjustable fixed value for the rear latent distance information. This means that the warning behavior remains fixed after the parameterization of the system, and the driver only has the option of adapting himself accordingly.

The configurable time-gap threshold design presented here offers the driver the possibility of selecting between different options depending on his personal preferences.

The changed algorithms can be implemented in the decision unit, and the interface for warning time intervals, which can be selected by the user, can be implemented in the HMI unit.

A rear detection unit (rear-end radar) on a motorcycle is used to detect relevant following vehicles and to transmit measurement data that are processed by the decision unit. The decision unit (rear-end radar ECU) decides on the basis of the risk of danger and the time period selected by the user whether a warning is to be triggered about the following vehicle. The HMI unit (head unit display, driver helmet, smartphone connected to the motorcycle, warning displays) receives the warnings and makes it possible for the driver to configure the time period for the warning either via discrete options (i.e., early, medium, late) or a continuous option (i.e., slide control).

The warning is output if the time interval between the ego vehicle and the vehicle falls below a specific limit value for a specific time.

Time interval=relative distance from the vehicle/absolute speed of the motorcycle A configurable factor K is added here to this time period. The permissible relative distance between the rear end of the motorcycle and the front of the following vehicle is thus calculated before it triggers the warning message.

Triggering threshold=absolute speed of motorcycle*time value*$K$

And accordingly:

Triggering time interval = time value * $K$

The warning cascade function on the basis of the criticality of the situation can also include the configurable factor K. The settings for the critical warning levels can then also be configured according to the wishes of the driver.

The settings for the warning time period can be configured in the HMI device. The settings in the option menu can either be discrete preset options or a continuous slide control.

In the case of a following vehicle at a certain distance, information is output proportionally to the driving speed. Corresponding settings in the HMI unit (head-up display, helmet display, smartphones connected to the motorcycle) allow the settings for the warning time period to be configured.

Finally, it should be pointed out that terms like "having," "comprising," etc. do not exclude other elements or steps and terms like "a" or "an" do not exclude a plurality. Reference signs are not to be considered as limiting.

The invention claimed is:

1. A method for operating a motorcycle, the method comprising the following steps:
   determining a distance between the motorcycle and a vehicle following in a rear area of the motorcycle using a sensor system of the motorcycle directed toward the rear area; and
   providing distance information on a human-machine interface when a time gap, which is determined taking into account the determined distance and a current speed of the motorcycle, is smaller than a predefined time value,
   wherein the time value is adjusted using an input by a driver of the motorcycle.

2. The method according to claim 1, wherein the distance information is provided when the time gap is less than the time value for longer than a predefined duration.

3. The method according to claim 1, wherein the distance information is provided when a speed at which the vehicle is approaching the motorcycle is less than a limit value.

4. The method according to claim 3, wherein hazard information that maps a hazard to the motorcycle presented by the vehicle is provided when the approach speed is greater than the limit value.

5. The method according to claim 1, wherein the time value is adjusted using the speed of the motorcycle.

6. The method according to claim 1, wherein an intensity of the distance information is adjusted using the time gap.

7. The method according to claim 6, wherein advance warning distance information is provided when the time gap is smaller than an advance warning time value, and warning distance information is provided when the time gap is smaller than a warning time value, wherein the warning distance information has a higher intensity than the advance warning distance information, and the warning time value is smaller than the advance warning time value.

8. The method according to claim 1, wherein the distance information is provided when the vehicle is detected in the motorcycle's lane.

9. The method according to claim 8, wherein a course of the lane is determined using the trajectory traveled by the motorcycle.

10. The method according to claim 1, wherein at least two predefined time values are provided to be selected from for the input.

11. The method according to claim 1, wherein the time value is preselected by a driver of the motorcycle.

12. The method according to claim 1, wherein the time value is adjustable via an operator interface of the motorcycle.

13. A control unit configured to operate a motorcycle, the control unit configured to:

determine a distance between the motorcycle and a vehicle following in a rear area of the motorcycle using a sensor system of the motorcycle directed toward the rear area; and provide distance information on a human-machine interface when a time gap, which is determined taking into account the determined distance and a current speed of the motorcycle, is smaller than a predefined time value, wherein the time value is adjusted using an input by a driver of the motorcycle.

14. A non-transitory machine-readable storage medium on which is stored a computer program for operating a motorcycle, the computer program, when executed by a processor, causing the processor to perform the following steps:

determining a distance between the motorcycle and a vehicle following in a rear area of the motorcycle using a sensor system of the motorcycle directed toward the rear area; and providing distance information on a human-machine interface when a time gap, which is determined taking into account the determined distance and a current speed of the motorcycle, is smaller than a predefined time value, wherein the time value is adjusted using an input by a driver of the motorcycle.

* * * * *